(12) United States Patent
Leblanc et al.

(10) Patent No.: US 12,533,119 B2
(45) Date of Patent: Jan. 27, 2026

(54) REINFORCED ANCHORS AND METHODS OF TISSUE REPAIR

(71) Applicant: ARTHREX, INC., Naples, FL (US)

(72) Inventors: Shaun G. Leblanc, Naples, FL (US); Jason A. Valentin, Fort Myers, FL (US); Thomas Dooney, Jr., Naples, FL (US); Matthew Herrington, Naples, FL (US); Kyle Anderson, Detroit, MI (US)

(73) Assignee: ARTHREX, INC., Naples, FL (US)

( * ) Notice: Subject to any disclaimer, the term of this patent is extended or adjusted under 35 U.S.C. 154(b) by 228 days.

(21) Appl. No.: 18/329,077

(22) Filed: Jun. 5, 2023

(65) Prior Publication Data

US 2024/0398400 A1    Dec. 5, 2024

(51) Int. Cl.
*A61B 17/04* (2006.01)

(52) U.S. Cl.
CPC .. *A61B 17/0401* (2013.01); *A61B 2017/0409* (2013.01); *A61B 2017/0456* (2013.01); *A61B 2017/0464* (2013.01)

(58) Field of Classification Search
CPC ........ A61B 17/0401; A61B 2017/0409; A61B 2017/0414; A61B 2017/0458; A61B 2017/044; A61B 17/0487; A61B 2017/0464; A61B 2017/0445; A61B 2017/0454; A61B 2017/045; A61B 17/06166; A61B 2017/06185; A61B 2017/0456
See application file for complete search history.

(56) References Cited

U.S. PATENT DOCUMENTS

| | | | |
|---|---|---|---|
| 5,584,835 A | 12/1996 | Greenfield | |
| 5,984,926 A | 11/1999 | Jones | |
| 8,992,537 B1 | 3/2015 | McDonnell | |
| 10,321,906 B2 | 6/2019 | Stone et al. | |
| 10,966,705 B2 | 4/2021 | Rodriguez et al. | |
| 11,344,290 B1 | 5/2022 | Ninh | |
| 2003/0083662 A1* | 5/2003 | Middleton | A61B 17/7098 606/92 |
| 2007/0005068 A1 | 1/2007 | Sklar | |
| 2012/0053622 A1* | 3/2012 | Schulman | A61B 17/0401 606/232 |
| 2014/0249577 A1 | 9/2014 | Pilgeram et al. | |

(Continued)

FOREIGN PATENT DOCUMENTS

CN    214259573 U    9/2021

OTHER PUBLICATIONS

International Search Report and Written Opinion for International Application No. PCT/US2024/031804 dated Oct. 1, 2024.

*Primary Examiner* — Katherine M Shi

(74) *Attorney, Agent, or Firm* — Potomac Law Group, PLLC

(57) ABSTRACT

Reinforced surgical constructs and methods of reinforced anchor fixation in bone, as well as associated surgical repairs are disclosed. A reinforcement (anchoring device) is loaded onto a fixation device. The fixation device can be a knotless fixation device such as a hard-body anchor, or a knotless soft anchor such as an all-suture knotless anchor. The reinforcement can consist of an anchoring device that integrates with the fixation device, to improve and aid the fixation of the device into an existing tissue hole.

5 Claims, 14 Drawing Sheets

(56) References Cited

U.S. PATENT DOCUMENTS

| | | |
|---|---|---|
| 2014/0288597 A1 | 9/2014 | Fanton et al. |
| 2016/0074084 A1 | 3/2016 | McDonnell et al. |
| 2020/0054439 A1 | 2/2020 | Holowecky et al. |
| 2020/0214689 A1 | 7/2020 | Bosworth et al. |
| 2021/0000588 A1 | 1/2021 | Cain |
| 2022/0105242 A1 | 4/2022 | Carter et al. |

* cited by examiner

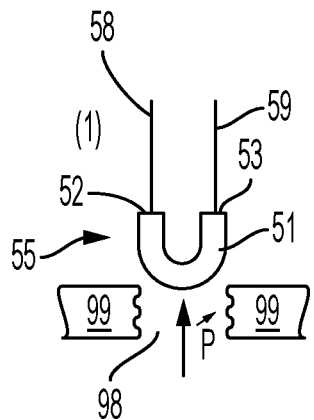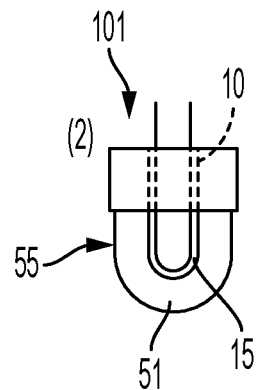
FIG. 1  FIG. 2
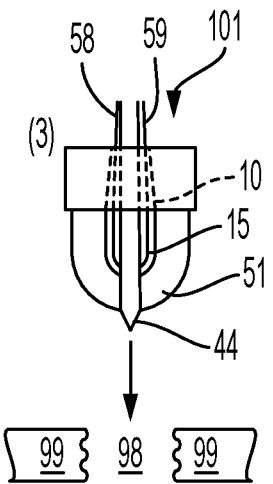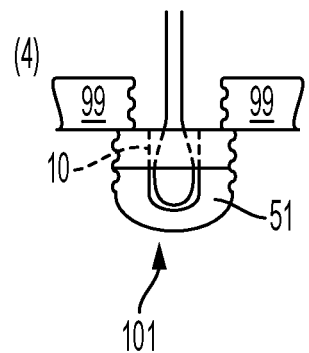
FIG. 3  FIG. 4
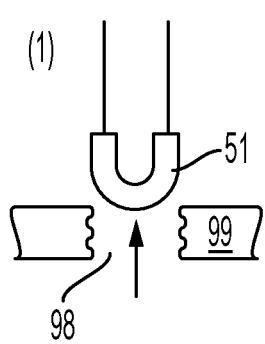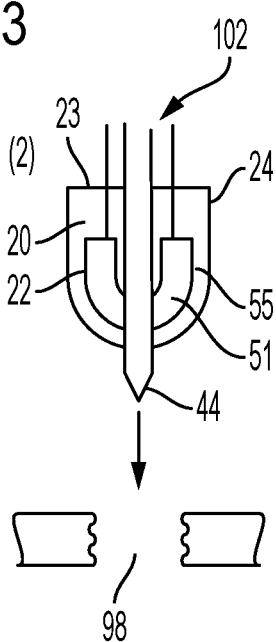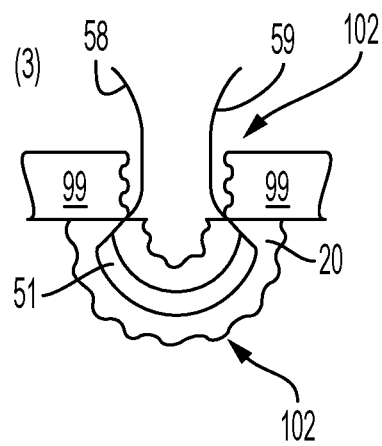
FIG. 5  FIG. 6  FIG. 7

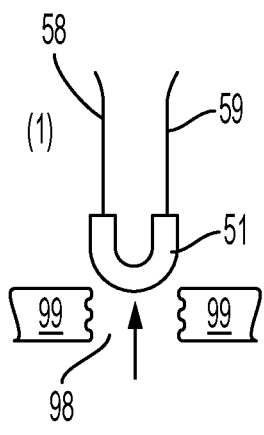
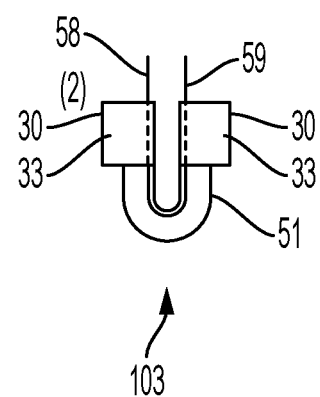
FIG. 8  FIG. 9
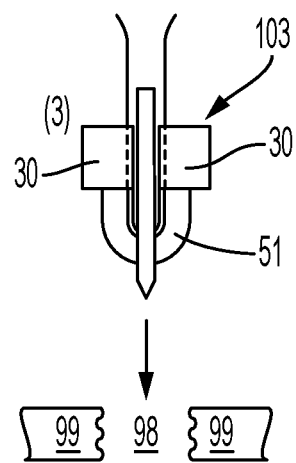
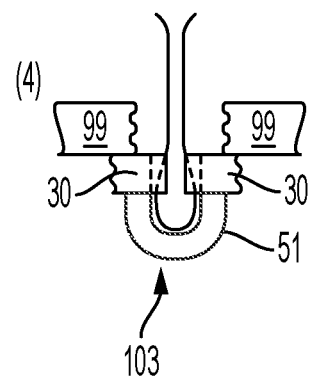
FIG. 10  FIG. 11

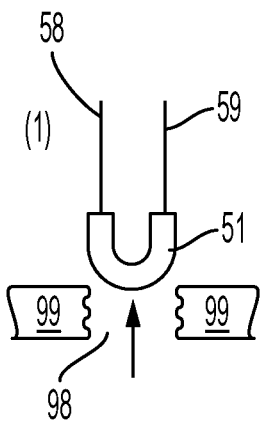
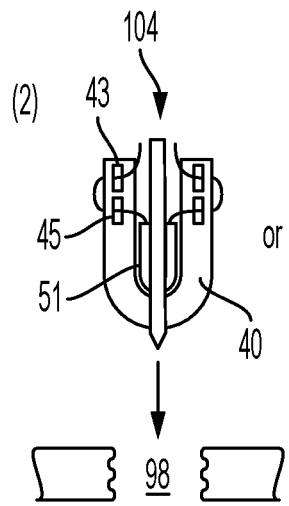
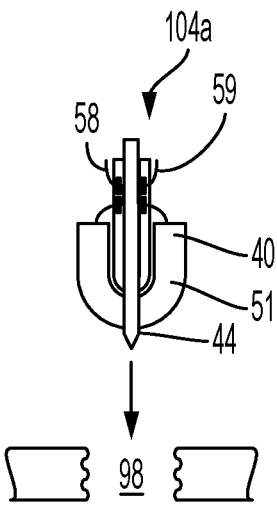
FIG. 12         FIG. 13         FIG. 14
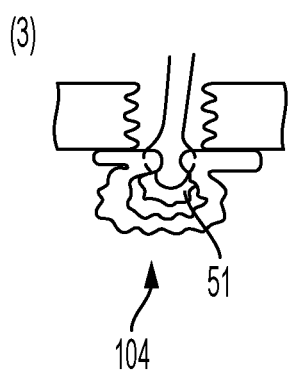
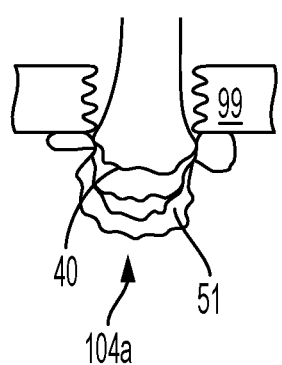
FIG. 15         FIG. 16

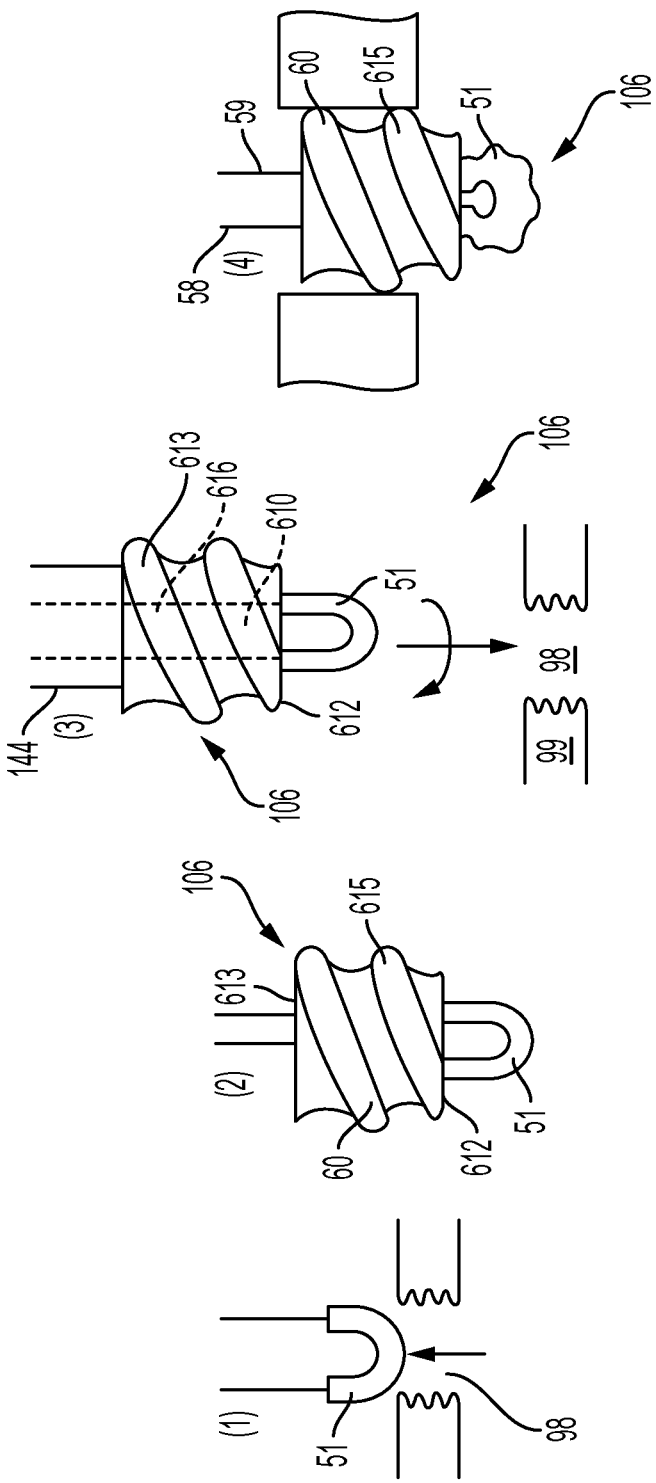

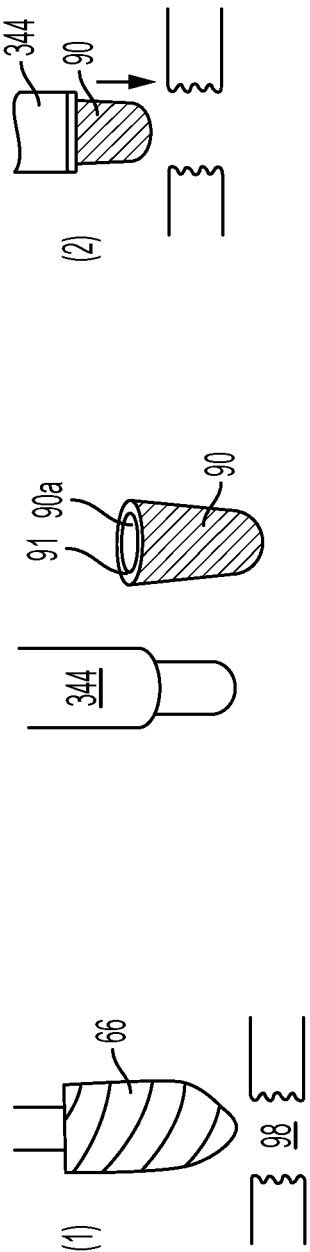

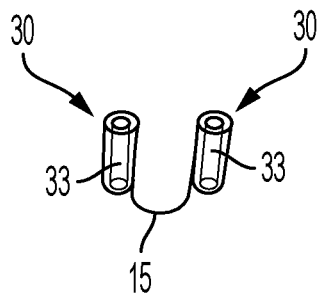
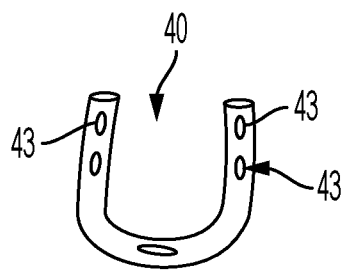
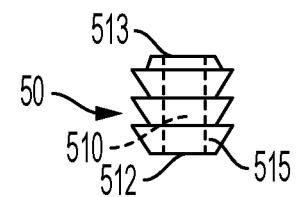
FIG. 47    FIG. 48    FIG. 49
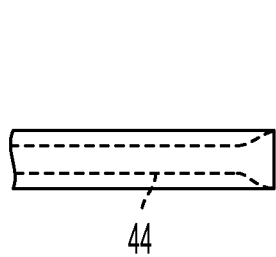
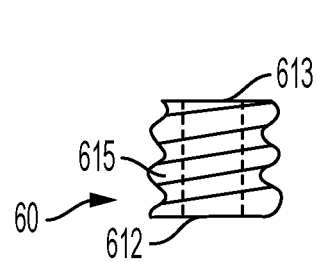
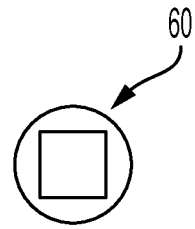
FIG. 50    FIG. 51    FIG. 52    FIG. 53
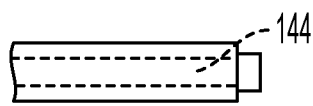
FIG. 54    FIG. 55
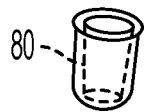
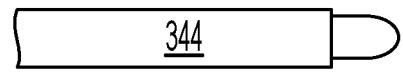
FIG. 56    FIG. 57    FIG. 58

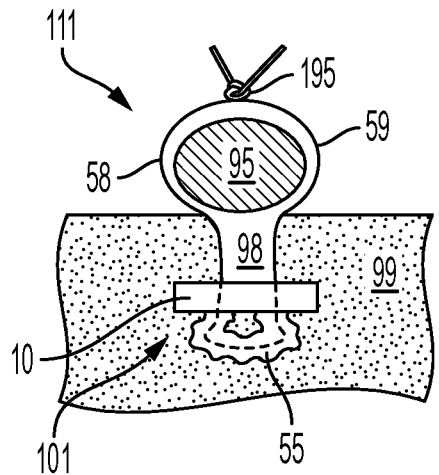
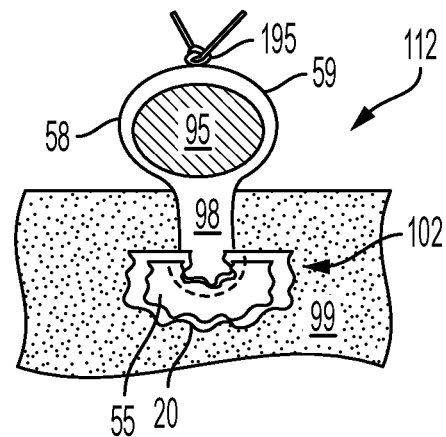
FIG. 59          FIG. 60
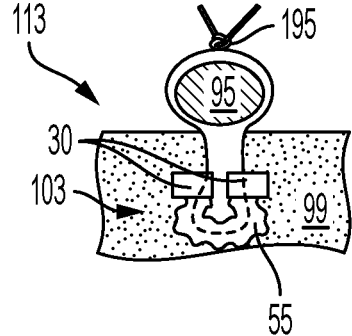
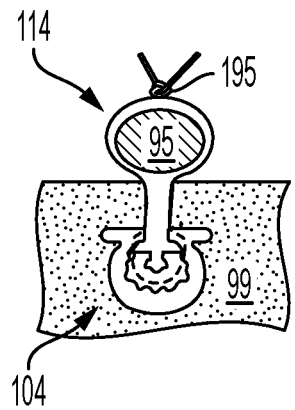
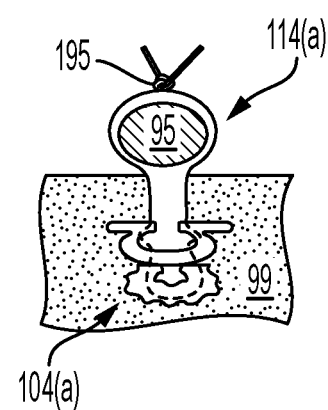
FIG. 61          FIG. 62A          FIG. 62B

REINFORCED ANCHORS AND METHODS OF TISSUE REPAIR

BACKGROUND

The disclosure relates to the field of surgery and, more specifically, to knotless anchor constructs and associated methods of tissue repairs and anchor fixation.

SUMMARY

Reconstruction systems, assemblies, constructs, and methods for anchor fixation and soft tissue repairs are disclosed.

A reinforced surgical construct can create a reinforced, knotless, tensionable repair. A reinforced surgical construct includes a reinforcement (anchoring device) loaded onto a fixation device. The fixation device can be a knotless fixation device such as a hard-body anchor, or a knotless soft anchor such as an all-suture knotless anchor. The reinforcement can consist of an anchoring device that integrates with the fixation device, to improve and aid the fixation of the device into an existing tissue hole. The reinforced surgical construct can be employed to securely fixate an anchor into tissue. The reinforced surgical construct can be employed in knotless fixation of first tissue to second tissue, for example, fixation of tendon to bone.

Methods of anchor fixation and tissue repair are also disclosed. In an embodiment, a knotless surgical construct provides reinforced soft tissue to bone fixation without any knot formation and with overall increased fixation of the anchoring device in bone.

BRIEF DESCRIPTION OF THE DRAWINGS

FIGS. 1-4 illustrate schematic steps of a tissue repair with an exemplary surgical construct.

FIGS. 5-7 illustrate schematic steps of a tissue repair with another exemplary surgical construct.

FIGS. 8-11 illustrate schematic steps of a tissue repair with another exemplary surgical construct.

FIGS. 12-16 illustrate schematic steps of tissue repairs with other exemplary surgical constructs.

FIGS. 21-25 illustrate schematic steps of a tissue repair with another exemplary surgical construct.

FIGS. 36-40 illustrate schematic steps of a tissue repair with another exemplary surgical construct.

FIGS. 45-58 illustrate additional views of the surgical constructs of FIGS. 1-40.

FIGS. 59-67 illustrate tissue repairs with the surgical constructs of FIGS. 1-40.

DETAILED DESCRIPTION

Figure 20:
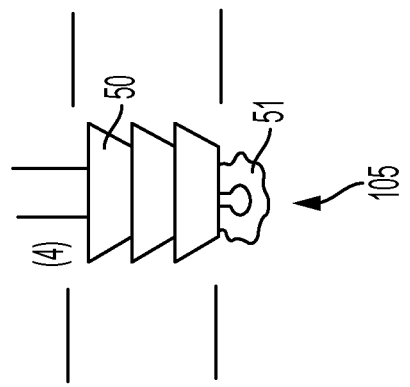
FIGS. 17-20 illustrate schematic steps of a tissue repair with another exemplary surgical construct.

Reinforced surgical constructs can create reinforced repairs. The constructs provide surgeons with means to improve bone fixation with an anchor after one or more attempts to achieve fixation of the anchor within soft tissue or bone have failed. An anchoring device (reinforcement) can integrate with an anchor after a failed attempt at fixation. The anchoring device can be used to improve the fixation of the original anchor in bone and/or tissue. The present disclosure provides various embodiments of an anchoring device integrating with a fixation device (a soft anchor or hard anchor). An anchoring device can be in the form of an attachable sleeve, ribbed sleeve, sheath, flexible coupler in the form of suture, tape or suture tape with or without perforations, cap or similar structures that can be attached to a soft anchor for bad bone or when the soft anchor pulls out. The disclosure has particular application for the use of anchors into humeral bone. The disclosure has particular application for the use of anchors into cortical bone or low-density bones.

A surgical tissue repair system includes a reinforced surgical construct with a fixation device loaded with a reinforcement (anchoring device). The fixation device can be a knotless fixation device. The fixation device can be a hard-body anchor. The fixation device can be a soft anchor such as an all-suture knotless anchor. The reinforcement (anchoring device) can include one or more sheaths or sleeves, sutures or suture tapes with or without perforations (such as a button-hole suture or an enlarged suture tape), a hard body interference device (such as an interference cap, a threaded cap or anchor body), or combinations thereof. The surgical construct can be employed in knotless fixation of first tissue to second tissue, for example, fixation of soft tissue to bone. The surgical construct can be tensionable, knotless, self-locking.

The reinforcement (anchoring device) acts as a "bail-out" device or "bail-out" structure in that it helps fixation in tissue of the original anchor that failed initial fixation (the "bailed-out" anchor"). The "bail-out" anchoring device prevents the surgeon from discarding the original anchor after one or more failed fixation attempts. As the tissue hole from the original fixation attempt(s) has been formed and as reinsertion of the original anchor fails as the hole is too large in diameter, the "bail-out" anchoring device helps in the reinsertion of the original anchor at the same tissue site (original hole) and allows its secure fixation.

Referring now to the drawings, where like elements are designated by like reference numerals, FIGS. 1-58 and 68-72 illustrate exemplary surgical construct 101, 101*a*, 101*b*, 101*c*, 102, 103, 104, 104*a*, 105, 106, 107, 108, 109, 110, 201, 203, 205, 206 (surgical assembly 101, 101*a*, 101*b*, 101*c*, 102, 103, 104, 104*a*, 105, 106, 107, 108, 109, 110, 201, 203, 205, 206; surgical system 101, 101*a*, 101*b*, 101*c*, 102, 103, 104, 104*a*, 105, 106, 107, 108, 109, 110, 201, 203, 205, 206; reinforced construct 101, 101*a*, 101*b*, 101*c*, 102, 103, 104, 104*a*, 105, 106, 107, 108, 109, 110, 201, 203, 205, 206; tensionable, knotless, reinforced anchor 101, 101*a*, 101*b*, 101*c*, 102, 103, 104, 104*a*, 105, 106, 107, 108, 109, 110, 201, 203, 205, 206; bailed-out anchor construct 101, 101*a*, 101*b*, 101*c*, 102, 103, 104, 104*a*, 105, 106, 107, 108, 109, 110, 201, 203, 205, 206) including exemplary fixation device 55, 66 with reinforcement 10, 10*a*, 10*b*, 10*c*, 20, 30, 40, 50, 60, 70, 80, 90 (anchoring device 10, 10*a*, 10*b*, 10*c*, 20, 30, 40, 50, 60, 70, 80, 90; reinforcing structure 10, 10*a*, 10*b*, 10*c*, 20, 30, 40, 50, 60, 70, 80, 90; reinforcing device 10, 10*a*, 10*b*, 10*c*, 20, 30, 40, 50, 60, 70, 80, 90; bail-out anchor 10, 20, 30, 40, 50, 60, 70, 80, 90) integrated with the fixation device 55, 66.

FIGS. 59-67 and 70 illustrate tissue repairs 111, 112, 113, 114, 114a, 115, 116, 118, 119, 120, 121 with surgical constructs 101, 101a, 102, 103, 104, 104a, 105, 106, 108, 109, 110.

Surgical constructs 101, 102, 103, 104, 104a, 105, 106, 107 of FIGS. 1-29 include fixation device 55 loaded with exemplary reinforcement 10, 20, 30, 40, 50, 60, 70. Fixation device 55 can be in the form of a soft anchor (soft suture anchor, or all-suture soft knotless anchor) provided with a soft anchor sleeve 51 (sheath or tubular member 51) with two open ends 52, 53, and at least one flexible coupler extending through the soft anchor sleeve (sheath) and with limbs 58, 59 (flexible ends 58, 59; flexible couplers 58, 59; flexible strands 58, 59; sutures 58, 59) each exiting an open end of the sheath 51. The flexible couplers may extend through the sleeve in similar or different directions and/or orientations and/or locations. Details of an exemplary soft suture anchor with a soft anchor sleeve (sheath or tubular member) and flexible shuttling strands are set forth, for example, in U.S. Pat. No. 10,849,734 issued Dec. 1, 2020, entitled "Methods of Tissue Repairs," the disclosure of which is incorporated by reference in its entirety herein. Although the embodiments below will be described with reference to fixation device 55 provided with only two exemplary flexible limbs 58, 59, it must be understood that the disclosure is not limited to this exemplary-only embodiment. Thus, the disclosure contemplates soft anchors with any number of flexible couplers and/or limbs (repair sutures) passing through sheath 51 and exiting the sheath at open ends 52, 53 or at any other location(s) spaced apart from either of the open ends 52, 53.

Fixation device 55 is illustrated in FIGS. 1, 5, 8, 12, 17, 21, and 26 after at least one failed attempt at fixation into tissue 99. Once the fixation device 55 has been pulled out of tissue 99 (or once it has pulled out by itself) in the direction of arrow P (FIG. 1), reinsertion of fixation device 55 into hole or opening 98 in tissue 99 typically results in another failed attempt by the surgeon. Providing a reinforcement to fixation device 55 prior to its reinsertion into the hole or opening 98 in tissue 99 prevents the fixation device 55 from being discarded and allows the surgeon to achieve tissue repair.

FIGS. 1-28 below illustrate various methods of anchor fixation in tissue (such as bone or soft tissue), as well as methods of tissue repairs, with fixation device 55 and reinforcement 10, 20, 30, 40, 50, 60, 70 ("bail-out" anchor 10, 20, 30, 40, 50, 60, 70; anchoring device 10, 20, 30, 40, 50, 60, 70; reinforcing structure 10, 20, 30, 40, 50, 60, 70; reinforcing device 10, 20, 30, 40, 50, 60, 70; bail-out device 10, 20, 30, 40, 50, 60, 70) integrated with the fixation device 55.

FIGS. 1-4 Single Sheath Embodiment:

This embodiment is a reinforcement in the form of an enlarged suture 10 that is sized appropriately to allow for all the sutures 58, 59 of soft anchor implant 55 to pass through the lumen of the sheath 10 until in contact with the soft anchor sheath 51.

The method of use can include the following steps: (1) in the event a soft anchor 55 pulls out (2) the sutures 58, 59 of or from the implant 55 will pass through the single sheath anchoring device 10 and pulled through until in contact with the implant anchor 55 to form construct 101 (FIG. 2). (3) Using the original inserter 44, the distal end of the inserter will pass through the lumen of the single sheath 10 and capture the loop lanyard 15 and soft anchor sheath 51 (FIG. 3). Once the lanyard 15 and soft anchor sheath 51 are secured, the repair sutures 58, 59 can be secured onto the inserter handle. (4) The surgeon reinserts the inserter 44 into the existing bone hole 98 in bone 99 (FIG. 4). The repair sutures 58, 59 can be released from the handle and the inserter 44 removed.

FIGS. 5-7 Enlarged Single Sheath Embodiment:

This embodiment is a reinforcement in the form of an enlarged sheath 20 that is sized appropriately to allow for all the sutures 58, 59 of a soft anchor implant 55 to pass through lumen 22 of the sheath 20 such that the repair ends 58, 59 of the soft anchor 55 pass through each end 23, 24 of the sheath 20. Sheath 20 can consists essentially of suture. Sheath 20 can be in the form of a tubular suture or tubular member. Sheath 20 can be in the form of a tubular member formed of various materials which may include suture, silk, cotton, nylon, polypropylene, polyethylene, ultrahigh molecular weight polyethylene (UHMWPE), polyethylene terephthalate (PET), and polyesters and copolymers thereof, or combinations thereof.

The method of use can include the following steps: (1) in the event a soft anchor 55 pulls out (2) the repair sutures 58, 59 from one end of the original implant 55 will pass through the enlarged single sheath anchoring device 20 and pulled through until the anchor body 51 of the implant 55 is centered inside the lumen 22 of the enlarged single sheath 20. The resulting construct 102 will manifest repair sutures 58, 59 of the soft anchor 55 exiting each end of the enlarged single sheath 20. The implant 55 can be loaded onto the inserter 44 using the original inserter to capture the enlarged single sheath 20 near center. (3) Then, the surgeon can reinsert the inserter 44 into the existing bone hole 98. The repair sutures 58, 59 can be released from the handle and the inserter 44 removed.

FIGS. 8-11 Double Sheath Embodiment:

This embodiment is a reinforcement in the form of two sutures 30 that are sized to allow for the suture limbs 58, 59 on each side of the soft anchor sheath 51 to pass individually through each lumen 33 of each of the two sutures 30. Double sheath anchoring device 30 can consists essentially of suture. Sheath 30 can be in the form of a tubular suture or suture tube. Sheath 30 can be in the form of a tubular member formed of various materials which may include suture, silk, cotton, nylon, polypropylene, polyethylene, ultrahigh molecular weight polyethylene (UHMWPE), polyethylene terephthalate (PET), and polyesters and copolymers thereof, or combinations thereof.

The method of use can include the following steps: (1) in the event a soft anchor 55 pulls out of hole 98 (FIG. 1) (2) the repair sutures 58, 59 from one side of the anchor 55 will pass through one of the lumens 33 of the double sheath anchoring device 30, followed by the repair sutures 58, 59 from the other side passing through the other lumen 33. The repair sutures 58, 59 can be pulled through the lumens 33 until the double sheath anchor device 30 is in contact with the implant anchor 55 to form construct 103 (FIG. 9). (3) Using the original inserter 44, the distal end of the inserter captures the loop lanyard 15 and soft anchor anchoring body 51. Once the lanyard 15 and soft anchor sheath 51 are secured, the repair sutures 58, 59 can be secured onto the inserter handle. (4) Then, the surgeon can reinsert the inserter 44 into the existing bone hole 91. The repair sutures 58, 59 can be released from the handle and the inserter 44 can be removed.

FIGS. 12-15 Button Hole Embodiment:

This embodiment is a reinforcement in the form of a button hole flexible coupler 40. Reinforcement 40 can be integrated with the original soft anchor 55 via repair suture 58, 59 of the original anchor 55 being passed through one or more button holes 43. FIGS. 13 and 14 illustrate reinforcement 40 provided with four exemplary button holes (apertures, holes, perforations, openings, slits, cuts, etc.), two on each side of flexible coupler 40 and with an additional central hole.

Flexible coupler 40 can be formed of various materials which may include suture, silk, cotton, nylon, polypropylene, polyethylene, ultrahigh molecular weight polyethylene (UHMWPE), polyethylene terephthalate (PET), and polyesters and copolymers thereof, or combinations thereof. Flexible coupler 40 can have a rectangular or similar polygonal shape and formed of suture, elastic suture or tape, for example, multifilament, braided, knitted, or woven suture. In an exemplary-only embodiment, flexible coupler 40 can be formed of suture tape, for example, Arthrex FiberTape®, which is a high strength suture tape that is braided and rectangular-like in cross section and as disclosed in U.S. Pat. No. 7,892,256, the disclosure of which is incorporated by reference in its entirety herein.

The method of use can include the following steps: (1) in the event a soft anchor 55 pulls out of hole 98 (FIG. 12) (2) the repair sutures 58, 59 from one side of the anchor 55 will pass through the hole(s) 43 on one end of the button-holes sutures 40 in a zig-zag or looping fashion so that one end is captured by the repair suture 58, 59. Repeat previous step for the other repair suture end 58, 59 with other end of the button-holed suture loaded first. The repair sutures 58, 59 can be secured onto the inserter handle. FIGS. 13 and 14 illustrate two ways of looping repair sutures 58, 59 through holes 43. (3) Once the construct 104, 104*a* is loaded onto the inserter 44, the surgeon can reinsert the inserter 44 into the existing bone hole 98 (FIGS. 13 and 14). When the desired depth is achieved, the repair sutures 58, 59 can be released from the handle and the inserter 44 can be removed (FIGS. 15 and 16).

Figure 19:
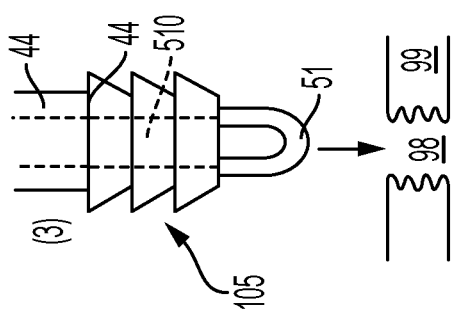

FIGS. 17-20 Interference Cap Embodiment:

This embodiment is a reinforcement in the form of a hard body interference anchor 50 (interference cap 50) that is sized appropriately to allow for all the sutures 58, 59 of a soft anchor implant 55 to pass through the anchor cannulation 510 until in contact with the soft anchor 55. Reinforcement 50 is a hard anchor body 50 provided with a longitudinal axis, a proximal end 513 and a distal end 512, and a plurality of ribs 515 extending circumferentially around it. Openings/channels can allow threading flexible couplers to pass around a post (not shown). Cannulation 510 extends along the body 50 to allow passage of flexible couplers and of any passing devices (if necessary). A socket (not shown) may be provided at proximal end 513 and configured to securely engage a tip of a driver inserter 44 (FIG. 19). The socket can have any shape adapted to receive a driver tip for pushing tap-in style caps.

Reinforcement 50 (anchor 50) can be a push-in style anchor. Reinforcement 50 (anchor 50) can be formed of metal, biocompatible plastic such as PEEK or a bioabsorbable PLLA material or a biocomposite material.

Figure 18:
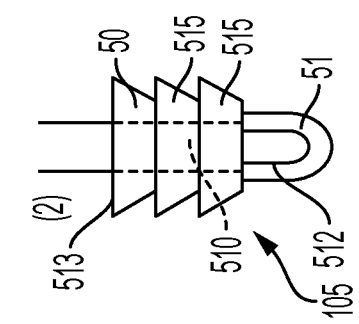
Figure 17:
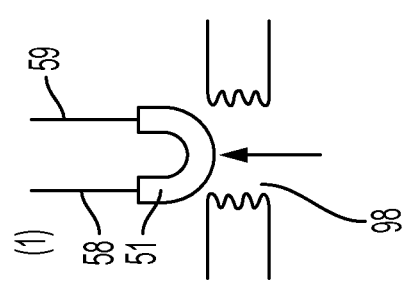

The method of use can include the following steps: (1) in the event a soft anchor 55 pulls out of hole 98 (FIG. 17) (2) the sutures 58, 59 from the implant 55 will pass through the anchor cannulation 510 and pulled through until in contact with the implant anchor 55 to form construct 105 (FIG. 18). (3) The sutures 58, 59 would be passed through inserter 44 that interfaces with the anchor 50 until the distal end of the inserter is in contact with the cap 50. The repair sutures 58, 59 are secured onto the inserter handle. (4) Then, the surgeon will reinsert the inserter 44 into the existing bone hole 98, via impaction, until the desired depth is achieved. The repair sutures 58, 59 will be released from the handle and the inserter 44 removed.

FIGS. 21-25 Threaded Cap Embodiment:

This embodiment is a reinforcement 60 in the form of a hard body interference anchor 60 (threaded cap 60) that is sized appropriately to allow for all the sutures 58, 59 of a soft anchor implant 55 to pass through the anchor cannulation 610 until in contact with the soft anchor.

Reinforcement 60 is a hard anchor body 60 provided with a longitudinal axis, a proximal end 613 and a distal end 612, and a plurality of threads 615 extending circumferentially around it. Openings/channels can allow threading flexible couplers to pass around a post (not shown). Cannulation 610 extends along the body 60 to allow passage of flexible couplers and of any passing devices (if necessary). A socket 616 (FIG. 23) can be provided at proximal end 613 and configured to securely engage a tip of a driver inserter 144. Socket 616 can have any shape adapted to receive a driver tip for inserting the screw-in style caps.

Reinforcement 60 (anchor 60) can be a screw-in style anchor. Reinforcement 60 (anchor 60) can be formed of metal, biocompatible plastic such as PEEK or a bioabsorbable PLLA material or a biocomposite material.

The method of use can include the following steps: (1) in the event a soft anchor 55 pulls out (2) the sutures 58, 59 of the implant 55 will pass through the anchor cannulation 610 and pulled through until in contact with the implant anchor (FIG. 22). (3) The sutures 58, 59 can be passed through an inserter 144 that interfaces with the anchor 60 until the distal end of the inserter is in contact with the cap 60 (FIG. 23). The repair sutures 58, 59 can be secured onto the inserter handle. (4) Then, the surgeon can reinsert the inserter 144 into the existing bone hole 98, via torsion, until desired depth is achieved. The repair sutures 58, 59 can be released from the handle and the inserter 144 can be removed.

Figure 29:
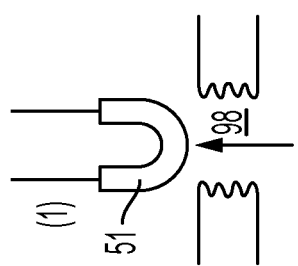
FIGS. 26-29 illustrate schematic steps of a tissue repair with another exemplary surgical construct.
Figure 28:
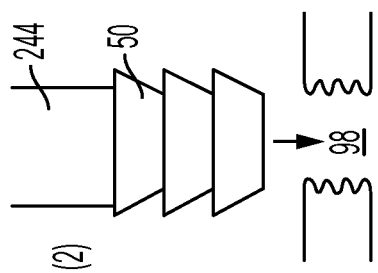

FIGS. 26-29 Anchor Embodiment:

This embodiment is a reinforcement 50 in the form of a hard body interference anchor 50 (anchor 50) that is sized appropriately to allow for all the sutures 58, 59 of a soft anchor implant 55 to pass through the anchor cannulation. Construct 107 of FIG. 29 is about similar to construct 105 of FIG. 20 in that it employs reinforcement 50 and implant 55; however, it differs in the order of steps and the fact that it employs two different inserters.

Figure 27:
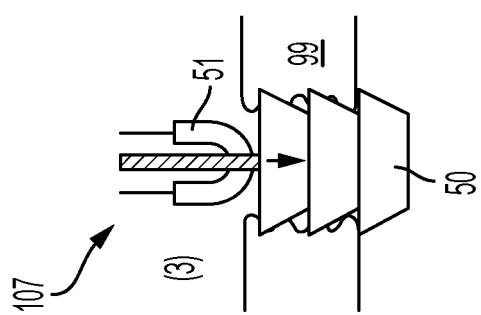
Figure 26:
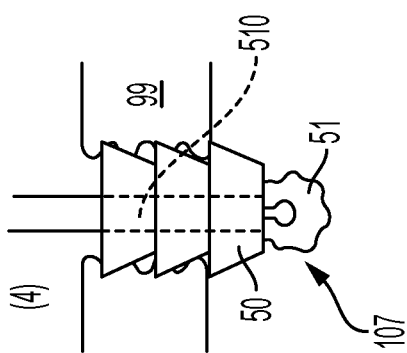

The method of use can include the following steps: (1) in the event a soft anchor 55 pulls out (2) the interference or threaded anchor 50 can be inserted into the original bone hole 98 with anchor inserter 244 (FIG. 27). (3) The soft anchor 55 can be reinstalled onto original inserter 44. The soft anchor 55 can be inserted into cannulation 510 of anchor 50. (4) The repair sutures 58, 59 can be released from the handle and the inserter 44 can be removed.

FIGS. 68-72 Single Cylinder Ribbed Sleeve Embodiment:

This embodiment is a reinforcement which is a supportive device in the form of a single cylinder sleeve 10*a* that is sized appropriately to allow for all the sutures 58, 59 of soft anchor implant 55 to pass through the lumen of the sleeve 10*a* until in contact with the soft anchor sheath 51. Cylinder sleeve 10*a* is provided a longitudinal slot 12*a* to attach over sutures from the soft anchor 55. A plurality of rings, ribs or protuberances 11*a* are provided circumferentially around the cylinder sleeve 10*a*. The plurality of rings 11*a* can be formed of a rigid or about rigid material and can be formed integral with the sleeve 10*a* or can be added subsequently. The plurality of rings 11*a* allows the sleeve 10*a* to collapse and expand.

Figure 71:
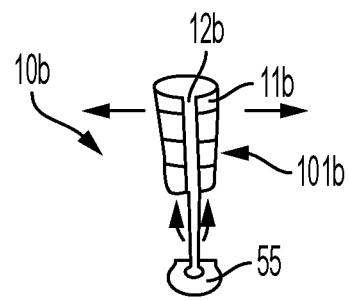
FIG. 71 illustrates an exemplary surgical construct.
Figure 72:
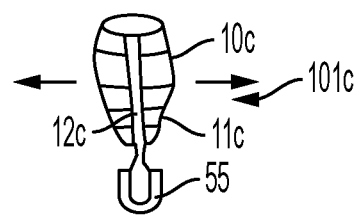
FIG. 72 illustrates another exemplary surgical construct.

FIGS. 71 and 72 illustrate additional exemplary embodiments for reinforcements 10b and 10c forming constructs 101b and 101c. Reinforcement 10b can be in the shape of a cylinder a bit more conical with the wider portion closest to the cortex. Reinforcement 10c can be more elliptical where the widest portion is in the center but small enough to get through the pilot hole but then expands as the soft anchor 55 backs up.

Figures 68, 69, 70:
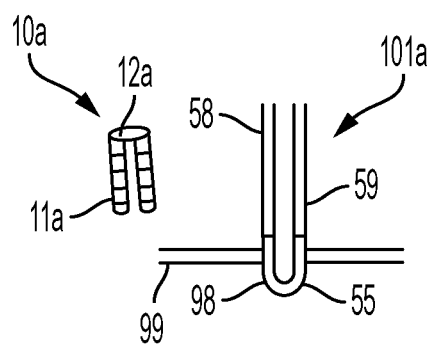
FIGS. 68-70 illustrate schematic steps of a tissue repair with another exemplary surgical construct.

The method of use can include the following steps: (1) in the event a soft anchor 55 pulls out (2) the sutures 58, 59 of or from the implant 55 will pass through the single cylinder sleeve 10a, 10b, 10c and pulled through until in contact with the implant anchor 55 to form construct 101a, 101b, 101c (FIGS. 69, 71 and 72). The sleeve 10a, 10b, 10c is attached over sutures when the soft anchor 55 pulls out of the pilot hole. (3) Using the original inserter 44, the distal end of the inserter will pass through the lumen of the single cylinder sleeve 10a, 10b, 10c and soft anchor sheath 51. The repair sutures 58, 59 can be secured onto the inserter handle. (4) The surgeon reinserts the inserter 44 into the existing bone hole 98 in bone 99 (FIG. 70). The single cylinder sleeve 10a, 10b, 10c collapses like an accordion. The plurality of ribs or rings 11a, 11b, 11c or material would widen as it collapses pulling back on the soft anchor 55 (FiberTak® anchor 55). As shown in FIG. 70, sleeve 10a collapses and widens horizontally as the soft anchor 55 is pulled up. The repair sutures 58, 59 can be released from the handle and the inserter 44 removed.

Figure 30:
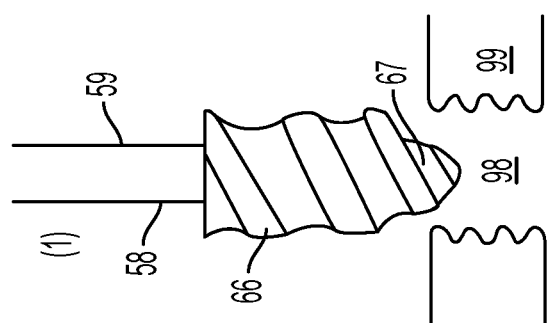
FIGS. 30-32 illustrate schematic steps of a tissue repair with another exemplary surgical construct.
Figure 31:
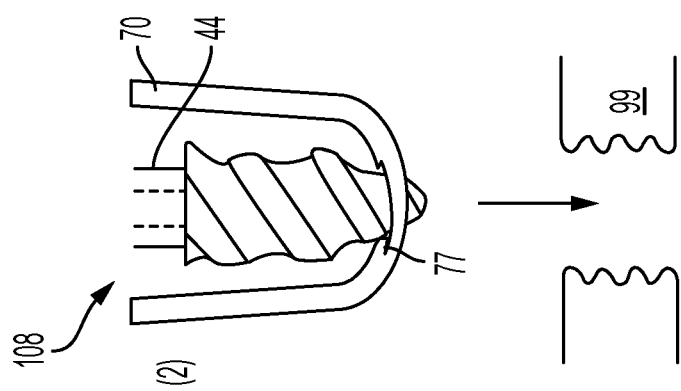
Figure 32:
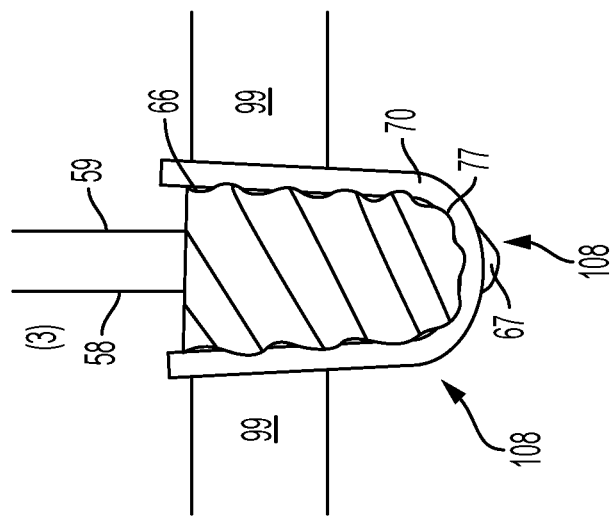
Figure 33:
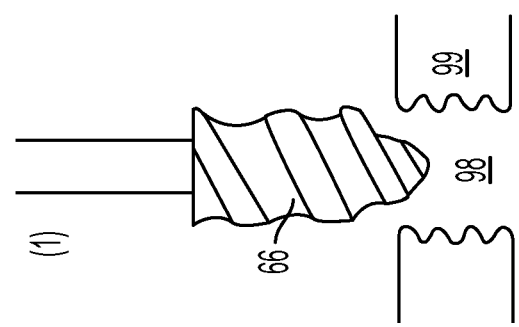
FIGS. 33-35 illustrate schematic steps of a tissue repair with another exemplary surgical construct.

Reference is now made to FIGS. 30-40, which illustrate various methods of anchor fixation in tissue (such as in bone or soft tissue), as well as methods of tissue repairs, with fixation device 66 which is a hard-body anchor. As in the previously described embodiments, fixation device 66 is illustrated in FIGS. 30, 33 and 36 after at least one failed attempt at fixation into tissue 99. Once the fixation device 66 has been pulled out of tissue 99 (or once it has pulled out by itself), reinsertion of fixation device 66 into hole or opening 98 in tissue 99 will typically result in another failed attempt by the surgeon. Providing a reinforcement to fixation device 66 (prior to its reinsertion into the hole or opening 98 in tissue 99) prevents the fixation device 66 from being discarded and allows the surgeon to achieve the desired tissue repair.

As shown in FIGS. 30-40, fixation device 66 can be a screw-in or a push-in style anchor. Fixation device 66 can be formed of metal, biocompatible plastic such as PEEK or a bioabsorbable PLLA material or a biocomposite material. A socket at the distal end of the fixation device 66 is configured to securely engage a tip of a driver, as detailed below. The socket can have any shape adapted to receive a driver tip for pushing tap-in or screw-in style anchors.

Fixation device 66 can be made of one or more pieces or can be provided as an integrated device. In an exemplary embodiment, fixation device 66 is a Corkscrew® anchor. In an exemplary embodiment, fixation device 66 is a knotless suture anchor such as the two-piece Arthrex PushLock® anchor, disclosed in U.S. Pat. No. 7,329,272, or an Arthrex SwiveLock® anchor, disclosed in U.S. Pat. Nos. 8,012,174 and 9,005,246, the disclosures of all of which are fully incorporated by reference in their entirety herein. An exemplary knotless fixation device 66 can comprise an anchor body (or screw) and an eyelet.

FIGS. 30-32 Button-Hole Suture Embodiment:

This embodiment is a reinforcement 70 in the form of a button-holed flexible coupler 70 (button-holed suture 70) that contains one or more perforations along the length of the suture, for the tip 67 of a hard anchor 66 to penetrate therethrough.

Reinforcement 70 is a flexible coupler provided with at least one hole 77 (aperture, buttonhole, perforation, opening, slit) to allow contact with and passage therethrough of the tip of hard anchor 66.

Flexible coupler 70 can be formed of various materials which may include suture, silk, cotton, nylon, polypropylene, polyethylene, ultrahigh molecular weight polyethylene (UHMWPE), polyethylene terephthalate (PET), and polyesters and copolymers thereof, or combinations thereof. Flexible coupler 40 can have a rectangular or similar elongate polygonal shape and formed of suture, elastic suture or tape, for example, multifilament, braided, knitted, or woven suture. In an exemplary-only embodiment, flexible coupler 40 can be formed of suture tape, for example, Arthrex FiberTape®, which is a high strength suture tape that is braided and rectangular-like in cross section and as disclosed in U.S. Pat. No. 7,892,256, the disclosure of which is incorporated by reference in its entirety herein.

The method of use can include the following steps: (1) in the event a hard anchor 66 pulls out (2) the hard anchor 66 will be reinstalled onto the original inserter 44. Tip 67 of the anchor 66 penetrates hole 77 of the button hole suture 70 until secured, to form construct 108 (FIG. 31). All sutures 58, 59 are secured on handle of inserter 44 (FIG. 31). (3) Then the surgeon can reinsert the inserter 44 into the existing bone hole 98, via a surgical technique (i.e., impaction, torsion, etc.) until depth is achieved. The repair sutures 58, 59 can be released from the handle and the inserter 44 can be removed.

Figure 34:
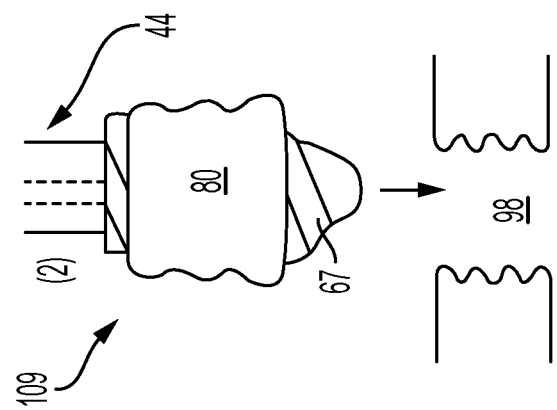
Figure 35:
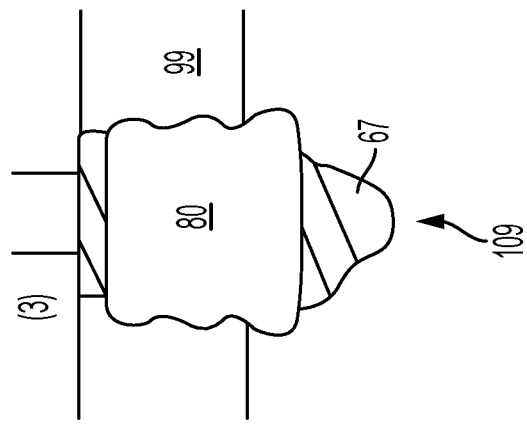
Figure 41:
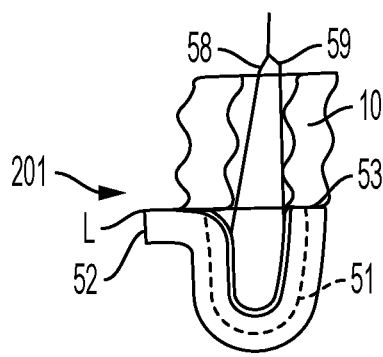
FIGS. 41-44 illustrate schematic views of surgical constructs according to exemplary embodiments.
Figure 42:
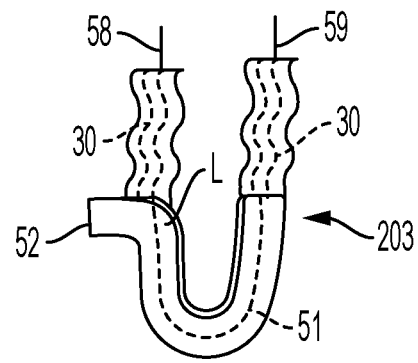
Figure 43:
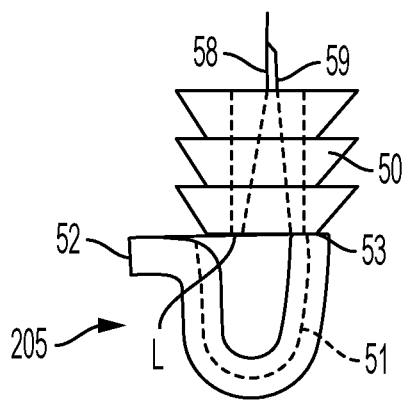
Figure 44:
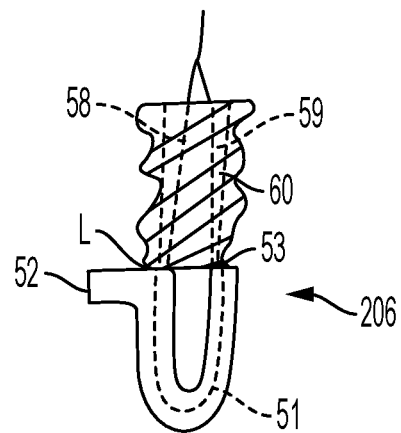
Figure 45:
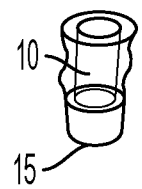
Figure 46:
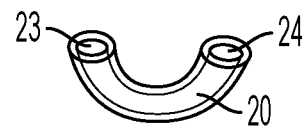
Figure 63:
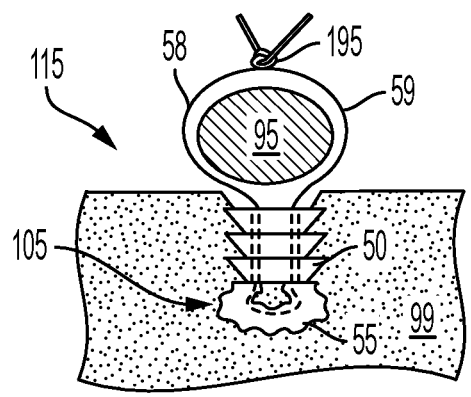
Figure 64:
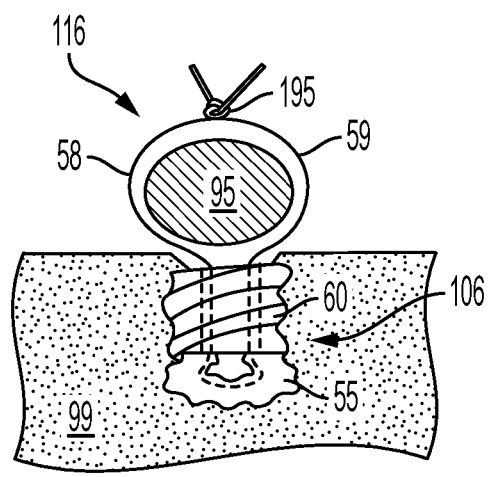
Figure 65:
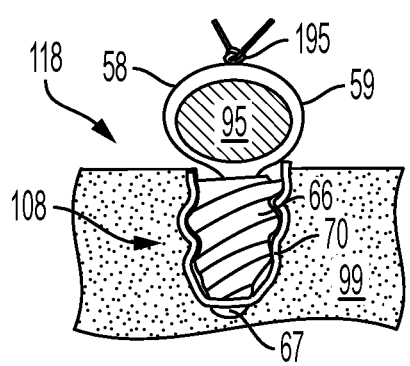
Figure 66:
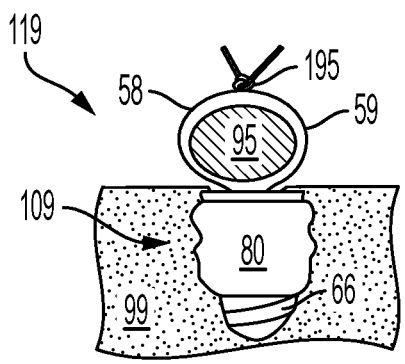
Figure 67:
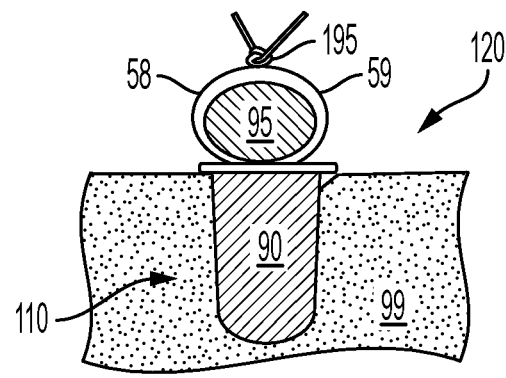

FIGS. 33-35 Fitted Sheath Suture Embodiment:

This embodiment is a reinforcement 80 in the form of a fitted sheath suture 80 designed to envelop a hard anchor body 66. Reinforcement 80 can be in the form of a sleeve or sheath or tubular member (in part similar to reinforcement 10, 20, 30 detailed above) but designed to securely enwrap and enclose (envelop) at least part of the outer surface of fixation device 66. In an embodiment, sheath 80 enwraps about the whole outer surface area of the anchor body. In an embodiment, sheath 80 enwraps the whole outer surface area of the anchor body except the distal tip 67.

The method of use can include the following steps: (1) in the event a hard anchor 66 pulls out (2) the hard anchor 66 can be reinstalled onto the original inserter 44. The tip 67 of the anchor 66 can be introduced to the cavity or lumen of the sheath 80 until secured to form construct 109 (FIG. 34). All sutures 58, 59 can be secured on handle of inserter 44 (if applicable). (3) Then the surgeon can reinsert the inserter 44 into the existing bone hole 98, via a surgical technique (i.e., impaction, torsion, etc.) until depth is achieved. The repair sutures 58, 59 can be released from the handle and the inserter can be removed.

FIGS. 36-40 Basket Embodiment:

This embodiment is a reinforcement 90 in the form of a basket 90 (holder 90; container 90; basket anchor 90). Basket 90 can be made of a material that conforms to a threaded anchor 66 or interference anchor body 66. The basket 90 has a single opening 90a and a rim 91 (FIG. 37) to keep the basket 90 positioned on tissue surface (for example, on the bone surface). Basket opening 90a (FIG. 37) is sized appropriately to allow for a threaded or interference anchor 99 to pass through the opening. One or more barbs or spikes (protuberances, projections, protrusions, indentations) can be present on the underside of the rim or on the exterior of the basket 90, to keep the anchor 90 affixed to the tissue (such as bone) once inserted.

The method of use can include the following steps: (1) in the event a hard anchor 66 pulls out (2) the basket 90 can be inserted into the original bone hole 98. Once rim 91 is positioned on the surface of bone 99, basket inserter 344 (FIG. 37) can be removed leaving the basket 90 inside the bone hole 98. (3) The hard body anchor 66 can be reinstalled onto its original inserter (not shown). The distal end 67 of the anchor 66 will be inserted into the opening 90a of the basket 90 and threaded or impacted into the basket 90 until depth is achieved (FIG. 39). The anchor inserter can then be removed. (4) The inserter can be removed leaving the anchor 66 fixed in the bone hole 98.

Reference is now made to FIGS. 41-44, which illustrate additional surgical constructs 201, 203, 205, 206. These constructs are similar in part to surgical constructs 101, 103, 105, 106 detailed above in that they also include exemplary reinforcement 10, 30, 50, 60. Surgical constructs 201, 203, 205, 206 differ, however, in that flexible limb 58 exits the sheath 51 of soft anchor 55 at a location "L" spaced apart from open end 52. Flexible limb 59 exists sheath 51 through the open end 53. The two flexible limbs 58, 59 can be also connected initially (as shown in FIHS. 41, 43, 44) to be disconnected subsequently by surgeon (for example, by being cut open or removing the splice).

FIGS. 45-58 illustrate additional views of exemplary reinforcement 10, 20, 30, 40, 50, 60, 80 and 90.

FIGS. 59-67 illustrate tissue repairs 111, 112, 113, 114, 114a, 115, 116, 118, 119, 120 conducted with surgical constructs 101, 102, 103, 104, 104a, 105, 106, 108, 109, 110. First tissue 95 (for example, soft tissue 95) is approximated to a second tissue 99 (for example, bone 99) with a reinforced surgical construct that includes a reinforcement 10, 20, 30, 40, 50, 60, 70, 80, 90 loaded onto a fixation device 55, 66, wherein the fixation device 55, 66 has previously failed fixation in tissue. Flexible limbs 58, 59 of the fixation device 55, 66 can be secure to first tissue 99 by a knot (such as knot 195 of FIGS. 59-67) or by other methods known in the art. Reinforced soft tissue to bone repairs 111, 112, 113, 114, 114a, 115, 116, 118, 119, 120 are provided with overall increased fixation of the anchoring device 55, 66 in bone.

The constructs, systems and assemblies of the present disclosure can be employed in numerous soft tissue repairs and fixations, for example, knotless fixation of soft tissue (ligament, tendon, graft, etc.) to bone. The surgical constructs and methods of the present disclosure provide reinforced anchor fixation in bone, where the initial anchor fixation failed and/or the bone quality requires additional reinforcement. The reinforced construct includes a fixation device with one or more reinforcements (anchoring devices).

Fixation devices 55, 66 (hard or soft-body anchors 55, 66) are inserted into bone 99 with additional means 10, 10a, 10b, 10c, 20, 30, 40, 50, 60, 70, 80, 90 to improve bone fixation after one or more failed attempts to achieve fixation. The means 10, 10a, 10b, 10c, 20, 30, 40, 50, 60, 70, 80, 90 improve the fixation of the original anchor 55, 66 into bone. The means 10, 10a, 10b, 10c, 20, 30, 40, 50, 60, 70, 80, 90 can include one or more reinforcements or reinforcing structures. The means 10, 10a, 10b, 10c, 20, 30, 40, 50, 60, 70, 80, 90 can include one or more anchoring devices which can be in the form of one or more enlarged couplers 10, 10a, 10b, 10c, 20, 30, 40, 70, 80 (suture or tape, for example, multifilament, braided, knitted, woven suture, or including fibers of ultrahigh molecular weight polyethylene (UHMWPE)) provided with or without holes or perforations to allow attachment and passage therethrough of flexible couplers of the fixation devices (soft anchors). The reinforcement or reinforcing structure 10, 10a, 10b, 10c, 20, 30, 80 can be also in the form of one or two simple flexible cannulated sheaths (flexible sheath anchors) that allow attachment and passage therethrough of flexible couplers of the fixation devices (soft or hard anchors). The reinforcement or reinforcing structure 50, 60 can be also a hard anchoring device, for example, an interference cap or a threaded cap to allow attachment and passage therethrough of flexible couplers of the fixation devices (soft anchors). The reinforcement or reinforcing structure 90 can be in the form of a basket or similar structure.

Methods of anchor fixation in tissue such as bone are disclosed. A method of anchor fixation includes inter alia the steps of: (i) attaching a fixation device 55, 66 (for example, a hard-body anchor 66 or a soft-body anchor 55) to a reinforcement 10, 10a, 10b, 10c, 20, 30, 40, 50, 60, 70, 80, 90 to form a surgical construct 101, 101a, 101b, 101c, 102, 103, 104, 104a, 105, 106, 107, 108, 109, 110; and (ii) reinserting the fixation device 55, 66 into tissue (for example, bone). The surgical construct 101, 101a, 101b, 101c, 102, 103, 104, 104a, 105, 106, 107, 108, 109, 110 can be fully or partially inserted into tissue. The method can further include pulling out the fixation device 55, 66 from a hole 98 in the tissue 99 prior to the step of attaching the fixation device 55, 66 to the reinforcement 10, 10a, 10b, 10c, 20, 30, 40, 50, 60, 70, 80, 90. The method can further include passing flexible limbs 58, 59 of the fixation device 55, 66 through the reinforcement 10, 10a, 10b, 10c, 20, 30, 40, 50, 60, 70, 80, 90 to form the surgical construct 101, 101a, 101b, 101c, 102, 103, 104, 104a, 105, 106, 107, 108, 109, 110; and optionally attaching the flexible limbs 58, 59 to an inserter 44, 144, 244.

Methods of reinforced tissue repairs 111, 112, 113, 114, 114a, 115, 116, 118, 119, 120 are also disclosed. A surgical construct 101, 101a, 101b, 101c, 102, 103, 104, 104a, 105, 106, 107, 108, 109, 110 provides reinforced soft tissue to bone fixation, without any bone knot formation and with increased and reinforced fixation. A first tissue is approximated to a second tissue with a reinforced surgical construct that includes a reinforcement 10, 10a, 10b, 10c, 20, 30, 40, 50, 60, 70, 80, 90 loaded onto a fixation device 55, 66, wherein the fixation device 55, 66 has previously failed fixation in tissue. The reinforced surgical construct 101, 101a, 101b, 101c, 102, 103, 104, 104a, 105, 106, 107, 108, 109, 110 can be knotless and/or tensionable and/or self-locking.

An exemplary method comprises inter alia the steps of: (i) attaching a reinforcement 10, 10a, 10b, 10c, 20, 30, 40, 50, 60, 70, 80, 90 to a fixation device 55, 66 (for example, a hard-body anchor 66 or a soft-body anchor 55) to form a surgical construct, wherein the fixation device 55, 66 has previously undergone a failed fixation attempt into tissue 99; and (ii) reinserting the fixation device 55, 66 into tissue 99. The surgical construct 101, 101a, 101b, 101c, 102, 103, 104, 104a, 105, 106, 107, 108, 109, 110 can be fully or partially inserted into tissue. The method can further include passing flexible limbs 58, 59 of the fixation device 55, 66 through the reinforcement 10, 10a, 10b, 10c, 20, 30, 40, 50, 60, 70, 80, 90 to form the surgical construct; and optionally attaching the flexible limbs 58, 59 to an inserter 44, 144, 244, 344.

Another exemplary method comprises inter alia the steps of: (i) attaching a reinforcement 10, 10a, 10b, 10c, 20, 30, 40, 50, 60 to a soft-body anchor 55 to form a surgical construct 101, 101a, 101b, 101c, 102, 103, 104, 104a, 105, 106, 107, wherein the soft-body anchor 55 had previously undergone a failed fixation attempt into tissue 99; and (ii) reinserting the soft-body anchor 55 into tissue 99. The method can further include passing flexible limbs 58, 59 of the soft-body anchor 55 through the reinforcement 10, 10a, 10b, 10c, 20, 30, 40, 50, 60 to form the surgical construct; attaching the flexible limbs 58, 59 to an inserter 44, 144, 244; and inserting the surgical construct 101, 101a, 101b, 101c, 102, 103, 104, 104a, 105, 106, 107 into bone. The reinforcement 10, 10a, 10b, 10c, 20, 30, 40, 50, 60 can be in the form of one or more sleeves (sheaths), a flexible coupler, a button-holed suture, an interference cap, a threaded cap or any similar device that would allow attachment of flexible limbs to the reinforcement (anchoring device). The method can further include pulling on the flexible limbs to adjust tension around tissue (for example, soft tissue) to lock the construct; to allow the tissue 95 (for example, soft tissue 95) to achieve the desired location relative to the bone 99; and to allow proper tensioning of the final construct 111, 112, 113, 114, 114a, 115, 116, 118, 119, 120, 121.

Another exemplary method comprises inter alia the steps of: (i) attaching a reinforcement 70, 80, 90 to a hard-body anchor 66 to form a surgical construct 108, 109, 110, wherein the hard-body anchor 66 had previously undergone a failed fixation attempt into tissue; and (ii) reinserting the hard-body anchor 66 into tissue 99. The method can further include passing a distal end 67 of the hard-body anchor 66 through the reinforcement 70, 80, 90 to form the surgical construct; securing the surgical construct 108, 109, 110 to an inserter 44, 344; and inserting the surgical construct 108, 109, 110 into tissue. The reinforcement (anchoring device) can be in the form of one or more sleeves button-holed sutures, flexible coupler with at least one opening or hole, a basket-type construct or similar device.

The bail-out anchor 10, 10a, 10b, 10c, 20, 30, 40, 50, 60, 70, 80, 90 of the present disclosure provides surgeons with the means to improve bone fixation with a fixation device 55, 66 (anchor 55, 66) after an attempt to achieve fixation. An anchoring device 10, 10a, 10b, 10c, 20, 30, 40, 50, 60, 70, 80, 90 (a "bail-out" anchor) can integrate with an anchor 55, 66 after a failed attempt at fixation. The anchor device 10, 10a, 10b, 10c, 20, 30, 40, 50, 60, 70, 80, 90 can be used to improve the fixation of the original anchor 55, 66 in bone/tissue. The anchoring device can be integrated with a soft anchor and a hard anchor application.

Flexible couplers 58, 59 can be in the form of any elongated members, fibers, or materials, or combinations thereof. Flexible couplers 58, 59 can include a single filament, or fiber, or can include multiple continuous filaments, segments or regions of filaments that have different configurations (for example, different diameters and/or different compositions). The filament regions/segments can each be homogenous (i.e., formed of same material) or may be a combination of homogenous and heterogenous (i.e., formed of a plurality of materials). Exemplary materials may include suture, silk, cotton, nylon, polypropylene, polyethylene, ultrahigh molecular weight polyethylene (UHMWPE), polyethylene terephthalate (PET), and polyesters and copolymers thereof, or combinations thereof.

Flexible coupler 58, 59 can be a high-strength suture, such as an ultrahigh molecular weight polyethylene (UHMWPE) suture which is the preferred material as this material allows easy splicing. Alternatively, the high strength suture may be a FiberWire® suture, which is disclosed and claimed in U.S. Pat. No. 6,716,234, the entire disclosure of which is incorporated herein by reference. FiberWire® suture is formed of an advanced, high-strength fiber material, namely ultrahigh molecular weight polyethylene (UHMWPE), sold under the tradenames Spectra (Honeywell) and Dyneema (DSM) fibers, braided with at least one other fiber, natural or synthetic, to form lengths of suture material.

Flexible coupler 58, 59 can be also formed of suture tape, for example, Arthrex FiberTape®, which is a high strength suture tape that is braided and rectangular-like in cross section and as disclosed in U.S. Pat. No. 7,892,256, the disclosure of which is incorporated by reference in its entirety herein.

Flexible coupler 58, 59 can be also formed of a stiff material, or combination of stiff and flexible materials, particularly for the regions of the couplers that are passed/spliced through the body of the coupler and depending on whether they are employed with additional fixation devices. In addition, flexible couplers 58, 59 can be coated and/or provided in different colors for easy manipulation during the surgical procedure. Flexible couplers 58, 59 can be provided with tinted tracing strands, or otherwise contrast visually with the sheath 51 of the construct 55, which remains a plain, solid color, or displays a different tracing pattern, for example. Easy identification of suture in situ is advantageous in surgical procedures, particularly during arthroscopic surgeries, endoscopic and laparoscopic procedures.

The surgical constructs of the present disclosure can be employed in endoscopic surgery. The term "endoscopic surgery" refers to surgical procedures within a patient's body through small openings as opposed to conventional open surgery through large incisions. Additionally, surgical constructs as disclosed herein may be utilized in general surgical and specialty procedures other than soft tissue repairs.

The term "high strength suture" is defined as any elongated flexible member, the choice of material and size being dependent upon the particular application. For the purposes of illustration and without limitation, the term "suture" as used herein may be a cable, filament, thread, wire, fabric, or any other flexible member suitable for tissue fixation in the body.

What is claimed:

1. A method of reinforced anchor fixation in tissue, comprising the steps of:
    securing a reinforcement to an anchor that has previously failed fixation in tissue by attaching at least one flexible limb of the anchor to the reinforcement;
    securing the anchor and the reinforcement to an inserter;
    reinserting the anchor into tissue; and
    securing the anchor into tissue, wherein reinserting and securing the anchor into tissue is conducted at a same location where the anchor has previously failed fixation.

2. The method of claim 1, wherein the anchor is a soft-body anchor.

3. The method of claim 2, wherein the soft-body anchor is formed essentially of suture.

4. The method of claim 3, wherein the reinforcement is a sheath or a sleeve.

5. The method of claim 1, wherein the tissue is cortical bone.

* * * * *